United States Patent
Chu et al.

(10) Patent No.: US 9,619,892 B2
(45) Date of Patent: Apr. 11, 2017

(54) APPARATUS AND METHOD FOR EXTRACTING MOVEMENT PATH OF MUTUAL GEOMETRIC RELATIONSHIP FIXED CAMERA GROUP

(71) Applicant: ELECTRONICS AND TELECOMMUNICATIONS RESEARCH INSTITUTE, Daejeon (KR)

(72) Inventors: Chang Woo Chu, Daejeon (KR); Jae Hean Kim, Yongin (KR); Il Kyu Park, Daejeon (KR); Young Mi Cha, Busan (KR); Jin Sung Choi, Daejeon (KR); Bon Ki Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 36 days.

(21) Appl. No.: 14/271,029

(22) Filed: May 6, 2014

(65) Prior Publication Data
US 2014/0334675 A1 Nov. 13, 2014

(30) Foreign Application Priority Data
May 13, 2013 (KR) ........................ 10-2013-0053643

(51) Int. Cl.
*G06K 9/00* (2006.01)
*G06T 7/20* (2017.01)
*G06T 7/73* (2017.01)
*G06T 7/246* (2017.01)
*G06T 7/292* (2017.01)

(52) U.S. Cl.
CPC ............ *G06T 7/2033* (2013.01); *G06T 7/246* (2017.01); *G06T 7/292* (2017.01); *G06T 7/73* (2017.01); *G06T 2207/10016* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 5,036,474 A | * | 7/1991 | Bhanu | G06K 9/00791 348/117 |
| 5,978,017 A | * | 11/1999 | Tino | B60Q 1/52 348/148 |
| 7,042,440 B2 | * | 5/2006 | Pryor | A63F 13/02 345/156 |
| 7,982,665 B2 | | 7/2011 | Kumagai et al. | |
| 8,213,706 B2 | * | 7/2012 | Krishnaswamy | G05D 1/0253 382/103 |

(Continued)

*Primary Examiner* — Avinash Yentrapati
(74) *Attorney, Agent, or Firm* — NSIP Law (57) ABSTRACT

Provided is an apparatus and method for extracting a movement path, the movement path extracting apparatus including an image receiver to receive an image from a camera group in which a mutual positional relationship among cameras is fixed, a geographic coordinates receiver to receive geographic coordinates of a moving object on which the camera group is fixed, and a movement path extractor to extract a movement path of the camera group based on a direction and a position of a reference camera of the camera group using the image and the geographic coordinates.

17 Claims, 5 Drawing Sheets

(56) References Cited

U.S. PATENT DOCUMENTS

| | | | | |
|---|---|---|---|---|
| 8,373,763 B2 * | 2/2013 | Zhang | B60R 1/00 | 348/176 |
| 8,559,802 B1 * | 10/2013 | McClatchie | G03B 15/006 | 396/13 |
| 2008/0075358 A1 * | 3/2008 | Yu | G06T 7/0018 | 382/154 |
| 2008/0240616 A1 * | 10/2008 | Haering | G06K 9/00771 | 382/294 |
| 2009/0201361 A1 * | 8/2009 | Lyon | H04N 5/23238 | 348/36 |
| 2009/0290032 A1 * | 11/2009 | Zhang | B60R 1/00 | 348/211.9 |
| 2010/0033371 A1 * | 2/2010 | Kumagai | G01C 11/02 | 342/357.31 |
| 2011/0293142 A1 * | 12/2011 | Van Der Mark | G06T 7/0028 | 382/103 |
| 2012/0122062 A1 * | 5/2012 | Yang | G09B 9/00 | 434/219 |
| 2013/0010081 A1 * | 1/2013 | Tenney | G06T 7/002 | 348/47 |
| 2013/0070962 A1 * | 3/2013 | Yankun | G06T 7/20 | 382/103 |
| 2013/0128050 A1 * | 5/2013 | Aghdasi | H04N 7/181 | 348/158 |
| 2013/0162824 A1 * | 6/2013 | Sung | G01C 21/3602 | 348/148 |
| 2013/0215239 A1 * | 8/2013 | Wang | G06T 7/0071 | 348/50 |
| 2013/0236107 A1 * | 9/2013 | Fukaya | G06K 9/46 | 382/201 |
| 2014/0118557 A1 * | 5/2014 | Lee | H04N 17/002 | 348/175 |
| 2015/0086078 A1 * | 3/2015 | Sibiryakov | G06T 3/4038 | 382/104 |
| 2015/0145965 A1 * | 5/2015 | Livyatan | B60R 1/00 | 348/47 |
| 2015/0161456 A1 * | 6/2015 | Chevalley | B60R 1/00 | 348/148 |

\* cited by examiner

APPARATUS AND METHOD FOR EXTRACTING MOVEMENT PATH OF MUTUAL GEOMETRIC RELATIONSHIP FIXED CAMERA GROUP

CROSS-REFERENCE TO RELATED APPLICATION

This application claims the benefit of Korean Patent Application No. 10-2013-0053643, filed on May 13, 2013, in the Korean Intellectual Property Office, the disclosure of which is incorporated herein by reference.

BACKGROUND

1. Field of the Invention

The present invention relates to an apparatus and method for extracting a movement path, and more particularly, to a movement path extracting apparatus and method that may extract a movement path of a camera through an image sequence photographed using a camera group in which a mutual geometric relationship is fixed.

2. Description of the Related Art

A map service refers to a service provided in a mobile environment, a personal computer (PC) environment through the Internet, and the like. The map service provides map data desired by a user using satellite images or aerial photographs.

A recent map service also provides ground images photographed on the ground in addition to the map data of satellite images or aerial photographs, thereby providing a preview of an area desired by the user. In this example, the map service may provide panoramic ground images and thus, the user may view a panorama of a vicinity of the desired area.

The ground images may be mapped to map data corresponding to positions at which the ground images are photographed. In general, the ground images may be acquired from a photographing apparatus fixed on a transportation device. The transportation device may be used to acquire ground images of a wide area in a short time. In this example, the transportation device may use a position tracking apparatus to track a movement path of the transportation device.

A recent position tracking apparatus may obtain accurate positional information within a margin of error of a centimeter (cm) level since positions corrected at a reference station may be transferred over a network. Nevertheless, the position tracking apparatus may obtain the positional information at a relatively low frequency, when compared to a speed at which the ground images are photographed by the photographing apparatus. Thus, the map service may need to calculate the positions at which the acquired ground images are photographed, based on the obtained positional information.

Accordingly, a method of calculating a position of a photographing apparatus that photographs a ground image by analyzing the photographed ground image will be provided herein.

SUMMARY

An aspect of the present invention provides a movement path extracting apparatus and method that may analyze images of a camera group in which a mutual positional relationship is fixed and easily calculate a position of the camera group, irrespective of a disposition and a number of cameras.

Another aspect of the present invention also provides a movement path extracting apparatus and method that may convert, to an absolute position and direction, positional information of a moving object and a position and a direction of a camera group based on positions and directions of a reference camera and cameras remaining after excluding the reference camera from the camera group, thereby effectively calculating a direction and a position of the camera group in which spatial geographic information is matched, irrespective of constraints on the camera group in which a mutual positional relationship is fixed.

According to an aspect of the present invention, there is provided an apparatus for extracting a movement path, the apparatus including an image receiver to receive an image from a camera group in which a mutual positional relationship among cameras is fixed, a geographic coordinates receiver to receive geographic coordinates of a moving object on which the camera group is fixed, and a movement path extractor to extract a movement path of the camera group based on a direction and a position of a reference camera of the camera group using the image and the geographic coordinates.

The camera group may include a camera group in which projection origins of the cameras are identical, and a camera group in which projection origins of the cameras are fixed at predetermined intervals.

The geographic coordinates receiver may receive the geographic coordinates of the moving object in order to convert a position of the camera group to latitudinal and longitudinal coordinates.

The movement path extractor may extract feature points of images photographed by the reference camera from an image sequence of the images and match the feature points of the images photographed by the reference camera, and detect the direction and the position of the reference camera based on a result of the matching and extract the movement path of the camera group.

The movement path extractor may extract feature points of images photographed by cameras remaining after excluding the reference camera from the camera group, and match the feature points of the images photographed by the remaining cameras, and detect directions and positions of the remaining cameras based on a result of the matching, and extract the movement path of the camera group.

The movement path extractor may remove a result of matching feature points improperly matched during a process of matching the feature points of the images photographed by the remaining cameras, using an outlier removal algorithm.

The movement path extractor may extract a movement path based on a matrix between neighboring image frames as time elapses using a movement path of the reference camera and a relative positional relationship between the remaining cameras and the reference camera.

The matrix may employ one of a fundamental matrix and an essential matrix.

The movement path extractor may extract the movement path of the camera group by optimally performing a bundle adjustment with respect to a direction and a position of the camera group and three-dimensional (3D) geographic coordinates in which feature points of images photographed by the reference camera and the remaining cameras are compiled.

The movement path extractor may convert, to an absolute path of the camera group, the geographic coordinates and a relative movement path of the camera group based on a corresponding relationship of the feature points of the images photographed by the reference camera and the remaining cameras.

According to another aspect of the present invention, there is also provided a method of extracting a movement path, the method including receiving an image from a camera group in which a mutual positional relationship among cameras is fixed, receiving geographic coordinates of a moving object on which the camera group is fixed, and extracting a movement path of the camera group based on a direction and a position of a reference camera of the camera group using the image and the geographic coordinates.

The camera group may include a camera group in which projection origins of the cameras are identical, and a camera group in which projection origins of the cameras are fixed at predetermined intervals.

The receiving may include receiving the geographic coordinates of the moving object in order to convert a position of the camera group to latitudinal and longitudinal coordinates.

The extracting may include extracting feature points of images photographed by the reference camera from an image sequence of the images and matching the feature points of the images photographed by the reference camera, and detecting the direction and the position of the reference camera based on a result of the matching and extracting the movement path of the camera group.

The extracting may include extracting feature points of images photographed by cameras remaining after excluding the reference camera from the camera group, and matching the feature points of the images photographed by the remaining cameras, and detecting directions and positions of the remaining cameras based on a result of the matching, and extracting the movement path of the camera group.

The extracting may include removing a result of matching feature points improperly matched during a process of matching the feature points of the images photographed by the remaining cameras, using an outlier removal algorithm.

The extracting may include extracting a movement path based on a matrix between neighboring image frames as time elapses using a movement path of the reference camera and a relative positional relationship between the remaining cameras and the reference camera.

The matrix may employ one of a fundamental matrix and an essential matrix.

The extracting may include extracting the movement path of the camera group by optimally performing a bundle adjustment with respect to a direction and a position of the camera group and 3D geographic coordinates in which feature points of images photographed by the reference camera and the remaining cameras are compiled.

The extracting may include converting, to an absolute path of the camera group, the geographic coordinates and a relative movement path of the camera group based on a corresponding relationship of the feature points of the images photographed by the reference camera and the remaining cameras.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
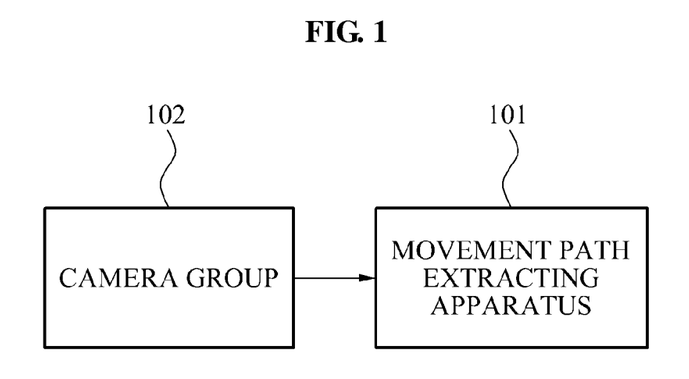
FIG. 1 is a block diagram illustrating a movement path extracting apparatus according to an embodiment of the present invention.

FIG. 1 is a block diagram illustrating a movement path extracting apparatus 101 according to an embodiment of the present invention.

Referring to FIG. 1, the movement path extracting apparatus 101 may receive an image from a camera group 102. The camera group 102 may include cameras among which a mutual positional relationship is fixed. In this example, a disposition and a number of the cameras included in the camera group 102 may not be limited. The camera group 102 may include a plurality of cameras of which projection origins are identical. The camera group 102 may include a plurality of cameras of which projection origins are fixed at predetermined intervals.

The movement path extracting apparatus 101 may receive geographic coordinates of a moving object on which the camera group 102 is fixed, through a position receiving apparatus. The position receiving apparatus may include a global positioning system (GPS) receiving apparatus that may track geographic coordinates of an object. The moving object may refer to an object on which the camera group 102 is fixed and that is movable from location to location. For example, the movement path extracting apparatus 101 may fix the camera group 102 on a transportation device movable from location to location. The transportation device may include all movable means, for example, an automobile, a truck, a motorcycle, and the like. The geographic coordinates may refer to coordinates to be used for converting a position of the camera group 102 to latitudinal and longitudinal coordinates.

The movement path extracting apparatus 101 may analyze the received image of the camera group 102. The movement path extracting apparatus 101 may determine a direction and a position of the camera group 102 through the analyzed image. In particular, the movement path extracting apparatus 101 may extract a movement path of the camera group 102 using the geographic coordinates and the image received from the camera group 102. In this example, the movement path extracting apparatus 101 may convert, to an absolute path with respect to an absolute position and direction, positional information of the moving object and the direction and the position of the camera group 102 based on positions and directions of a reference camera and cameras remaining after excluding the reference camera from the camera group 102.

Figure 2:
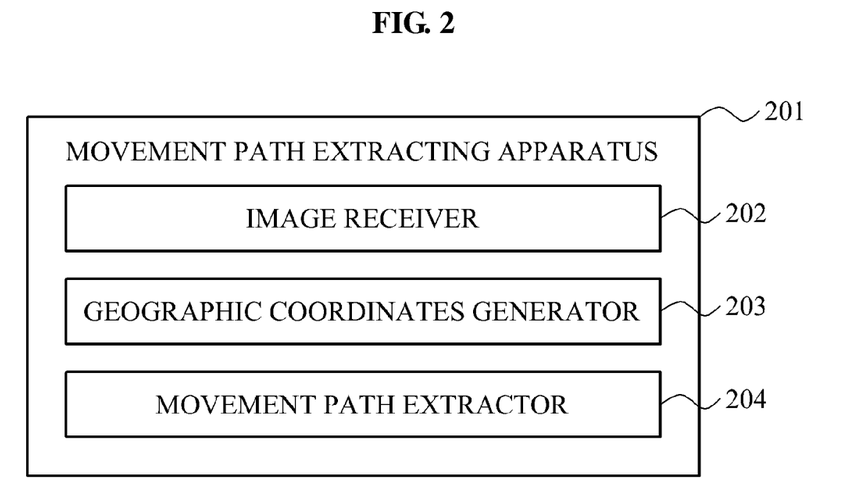
FIG. 2 is a block diagram illustrating a configuration of a movement path extracting apparatus according to an embodiment of the present invention.

FIG. 2 is a block diagram illustrating a configuration of a movement path extracting apparatus 201 according to an embodiment of the present invention.

Referring to FIG. 2, the movement path extracting apparatus 201 may include an image receiver 202, a geographic coordinates receiver 203, and a movement path extractor 204.

The image receiver 202 may receive an image photographed by a camera group. In this example, the camera group may include cameras among which a mutual positional relationship is fixed. The camera group may include a plurality of cameras for producing a panoramic image using the photographed image. The image receiver 202 may receive the image photographed by the camera group, irrespective of directions and positions of the cameras included in the camera group. The camera group may include a plurality of cameras of which projection origins are identical, and a plurality of cameras of which projection origins are fixed at predetermined intervals.

In particular, the image receiver 202 may receive images photographed by the plurality of cameras included in the camera group while the camera group fixed on the moving object moves along the moving object.

The geographic coordinates receiver 203 may receive geographic coordinates in order to convert a position of the camera group to latitudinal and longitudinal coordinates. To this end, the geographic coordinates receiver 203 may receive geographic coordinates of the moving object using a position receiving apparatus that may verify a position of the moving object.

The movement path extractor 204 may extract a movement path of the camera group based on a position and a direction of a reference camera of the camera group using the received image and the geographic coordinates received from the position receiving apparatus.

In particular, the movement path extractor 204 may set a single reference camera among the cameras constituting the camera group. In this example, the reference camera may be set at random by a user through a user interface, among the cameras constituting the camera group. In addition, the reference camera may be a criterion for calculating the movement path of the camera group.

The movement path extractor 204 may extract feature points of images of the reference camera from an image sequence photographed by the camera group. The movement path extractor 204 may match the extracted feature points of the images of the reference cameras. The movement path extractor 204 may calculate a direction and a position of the reference camera based on a result of the matching. In addition, the movement path extractor 204 may generate a movement path of the reference camera as time elapses based on the calculated direction and the position of the reference camera.

The movement path extractor 204 may extract feature points of images photographed by cameras remaining after excluding the reference camera from the camera group. The movement path extractor 204 may match the extracted feature points of the images of the remaining cameras. The movement path extractor 204 may calculate directions and positions of the remaining cameras, using a result of the matching.

In addition, the movement path extractor 204 may calculate image frames as time elapses using the movement path of the reference camera and a relative positional relationship between the reference camera and the remaining cameras. In this example, the movement path extractor 204 may calculate the image frames as time elapses for the respective cameras constituting the camera group. The movement path extractor 204 may calculate a fundamental matrix or an essential matrix among the image frames as time elapses. The movement path extractor 204 may obtain a geometrically meaningful result of matching the extracted feature points of all cameras constituting the camera group, using a result of calculating the fundamental matrix or the essential matrix. The movement path extractor 204 may calculate directions and positions of all cameras constituting the camera group, using the result of the matching. In this example, the movement path extractor 204 may calculate the directions and the positions of the reference camera and the remaining cameras constituting the camera group, thereby calculating the directions and the positions of all cameras constituting the camera group. The movement path extractor 204 may convert, to an absolute path with respect to an absolute direction and position of the camera group, the received geographic coordinates with respect to the position of the moving object and the direction and the position of the camera group.

The movement path extracting apparatus 201 may effectively calculate a direction and a position of a camera group using constraints on the camera group in which a mutual positional relationship is fixed. In addition, a result according to the position and the direction of the camera group of the movement path extracting apparatus 201 may be utilized for 3D modeling of an image, a map service using an image, and the like.

Figure 3:
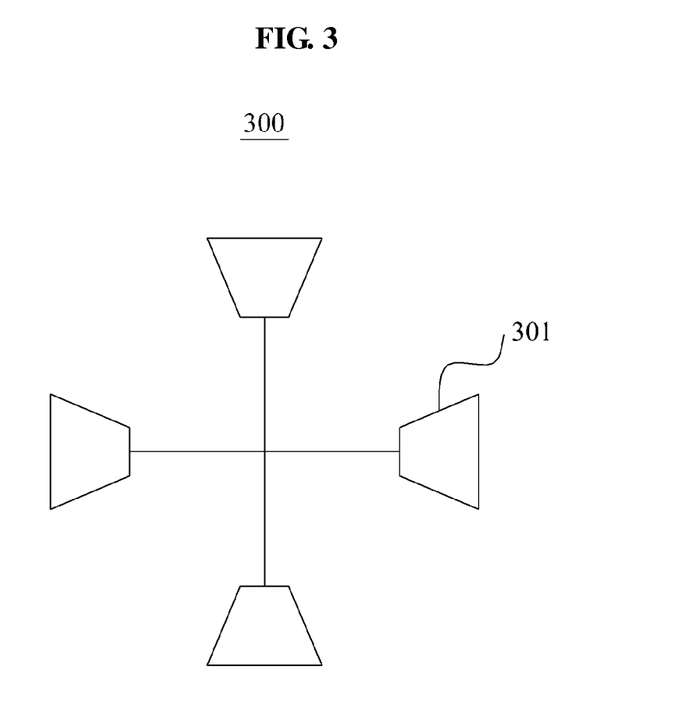
FIG. 3 is a diagram illustrating a camera group according to an embodiment of the present invention.

FIG. 3 is a diagram illustrating a camera group 300 according to an embodiment of the present invention.

Referring to FIG. 3, a form of the camera group 300 including cameras is illustrated. The camera group 300 may include at least one camera. The camera group 300 may include a single reference camera 301 among the cameras included in the camera group 300. The reference camera 301 refers to a camera being a criterion for extracting a movement path of the camera group 300.

The form of the camera group 300 is provided only as an example of the camera group 300. In particular, the form of the camera group 300 should not be construed as being limited to constraints on a camera group of a specific form, a specific number of cameras constituting a camera group, a specific positional relationship, and the like.

Figure 4:
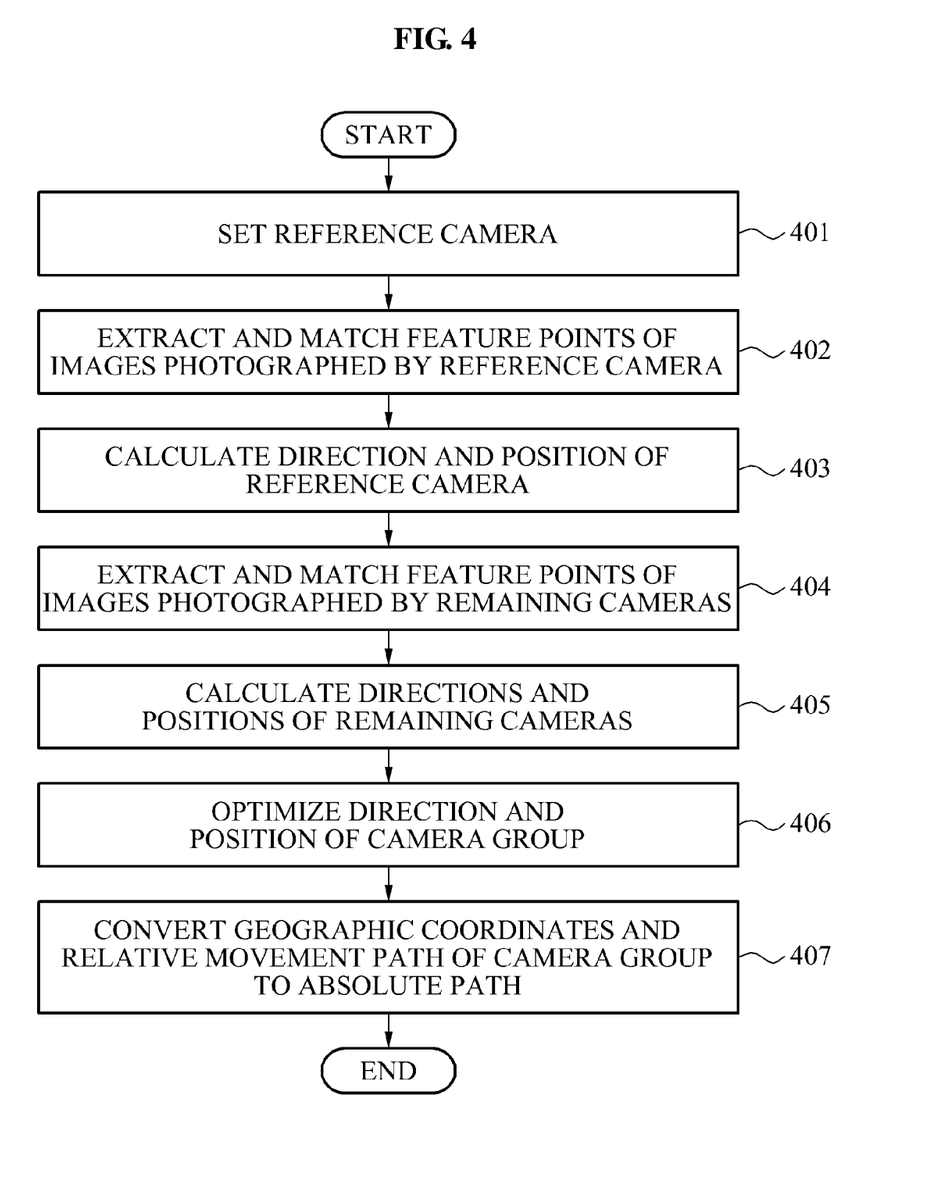
FIG. 4 is a flowchart illustrating a process of extracting a direction and a position of a camera group according to an embodiment of the present invention.

FIG. 4 is a flowchart illustrating a process of extracting a direction and a position of a camera group according to an embodiment of the present invention.

Referring to FIG. 4, in operation 401, a movement path extracting apparatus may set a single reference camera among cameras constituting a camera group. The movement path extracting apparatus may set the reference camera at random through a user interface by a user.

In operation 402, the movement path extracting apparatus may extract feature points of images photographed by the set reference camera. In this example, the movement path extracting apparatus may extract the feature points of the images photographed by the reference camera, using an image sequence photographed by the camera group. The movement path extracting apparatus may compare and match the feature points of the images. The movement path extracting apparatus may apply an outlier removal algorithm.

In particular, the movement path extracting apparatus may remove a result of matching feature points improperly matched during in a process of matching feature points of images photographed by cameras remaining after excluding the reference camera from the camera group, using the outlier removal algorithm. The movement path extracting apparatus may provide a more improved matching result, by removing the result of matching the improperly matched feature points, which are out of a reference value, using the outlier removal algorithm.

In operation 403, the movement path extracting apparatus may calculate a direction and a position of the reference camera based on a result of the matching. The movement path extracting apparatus may calculate the direction and the position of the reference camera in order to satisfy a restrictive condition of a physical distance between cameras. Here, the restrictive condition of the physical distance between the cameras may indicate that the physical distance between the cameras is ignored during calculation for acquiring a panoramic image using an image photographed by the camera group. The restrictive condition may occur since the physical distance between the cameras included in the camera group is shorter than a distance from an object captured in the image photographed by the camera group.

In addition, the movement path extracting apparatus may generate a movement path of the reference camera as time elapses based on the calculated direction and the position of the reference camera.

In operation 404, the movement path extracting apparatus may extract feature points of images photographed by the remaining cameras, using an image sequence photographed by the camera group. The movement path extracting apparatus may compare and match the feature points of the images photographed by the remaining cameras.

In particular, the movement path extracting apparatus may calculate a fundamental matrix or an essential matrix. The movement path extracting apparatus may obtain a geometrically meaningful matching result by calculating the fundamental matrix or the essential matrix. The fundamental matrix or the essential matrix may be a matrix between neighboring image frames as time elapses using a movement path of the reference camera and a relative positional relationship between the reference camera and the remaining cameras.

In addition, a different may occur while the movement path extracting apparatus matches the feature points based on a mutual geometric relationship among cameras. In particular, when the mutual geometric relationship among the cameras is established, the movement path extracting apparatus may match the feature points based on a result of calculating the fundamental matrix or the essential matrix, thereby reducing a time to be used for matching, when compared to a case in which the mutual geometric relationship among the cameras is not established.

The movement path extracting apparatus may obtain a stable result of calculating a direction and a position, since an image of a wide range acquired by at least one camera is used. In addition, the movement path extracting apparatus may remove a result of matching improperly matched feature points, by applying an outlier removal algorithm. The movement path extracting apparatus may increase an accuracy of calculation, by excluding, from calculation of the outlier removal algorithm, feature points of an object present at a distance greater than a distance between cameras. In this example, a difference between the distances may be greater than a predetermined threshold.

In operation 405, the movement path extracting apparatus may calculate directions and positions of the remaining cameras, using a result of the matching. In this example, the movement path extracting apparatus may calculate the directions and the positions of the remaining cameras constituting the temporally fixed camera group. In particular, the movement path extracting apparatus may calculate a direction and a position of a camera having an identical change in a temporal position and direction since the mutual positional relationship among cameras is fixed.

The movement path extracting apparatus may calculate the directions and the positions of the reference camera and the remaining cameras constituting the camera group, thereby calculating directions and positions of all cameras constituting the camera group. In particular, the movement path extracting apparatus may calculate a direction and a position of the camera group including the plurality of cameras.

When calculating the direction and the position of the camera group, the movement path extracting apparatus may apply a bundle adjustment by adding a relative position and a direction with respect to the reference camera to an optimization parameter. In this example, the movement path extracting apparatus may have a more number of optimization parameters and thus, use a more amount of time, when compared to a case in which a mutual geometric relationship among cameras of the camera group is known.

In addition, the movement path extracting apparatus may utilize the directions and the positions of all cameras constituting the camera group for calculation of a partial differential matrix of each parameter and projection matrix data for calculating an image projection point of a 3D point.

In operation 406, the movement path extracting apparatus may calculate identical 3D coordinates from the calculated direction and the position of the reference camera and the directions and the positions of the remaining cameras. The movement path extracting apparatus may optimize the direction and the position of the camera group and the calculated 3D coordinates simultaneously using a bundle adjustment.

In general, a bundle adjustment may use values of a direction and a position of a camera as parameters with respect to all images. The bundle adjustment according to an embodiment may be used as a parameter for optimizing the direction and the position of the reference camera in the camera group in which a mutual geometric relationship among cameras is fixed.

In operation 407, the movement path extracting apparatus may convert, to an absolute path of the camera group, the geographic coordinates and a relative movement path of the camera group based on a corresponding relationship of the feature points of the images photographed by the reference camera and the remaining cameras. In particular, the movement path extracting apparatus may calculate a relative position and a direction of the camera group by matching the feature points of the images photographed by the camera group. The movement path extracting apparatus may convert the relative movement path to the absolute path of the camera group, using a movement path of the relative position and the direction and the geographic coordinates including a longitude and latitude of a moving object.

In particular, the movement path extracting apparatus may collect the direction and the position of the camera group at a point in time similar to a point in time at which a position of the moving object is received. The movement path extracting apparatus may extract the relative position and the direction of the camera group corresponding to the longitude and the latitude of the moving object, calculate values of scale conversion, rotation, translation, and the like, and convert the extracted relative position and the direction of the camera group to the absolute path with respect to an absolute position and direction.

In this example, the movement path extracting apparatus may calculate the absolute path with respect to the absolute position and direction of the camera group, without performing a special non-linear optimization operation. In particular, the movement path extracting apparatus may have a more number of parameters to be used for calculating the absolute position and direction than a number of parameters to be used for calculating the longitude and the latitude of the moving object and thus, calculate the absolute path with respect to the absolute position and direction of the camera group, without performing the special non-linear optimization operation.

The movement path extracting apparatus according to an embodiment may calculate the absolute position and direction of the camera group through the process described above, thereby extracting the movement path of the camera group.

The movement path extracting apparatus according to an embodiment may calculate the position and the direction of the camera group, similar to the present disclosure, although the mutual geometric relationship among the cameras of the camera group is unknown.

Figure 5:
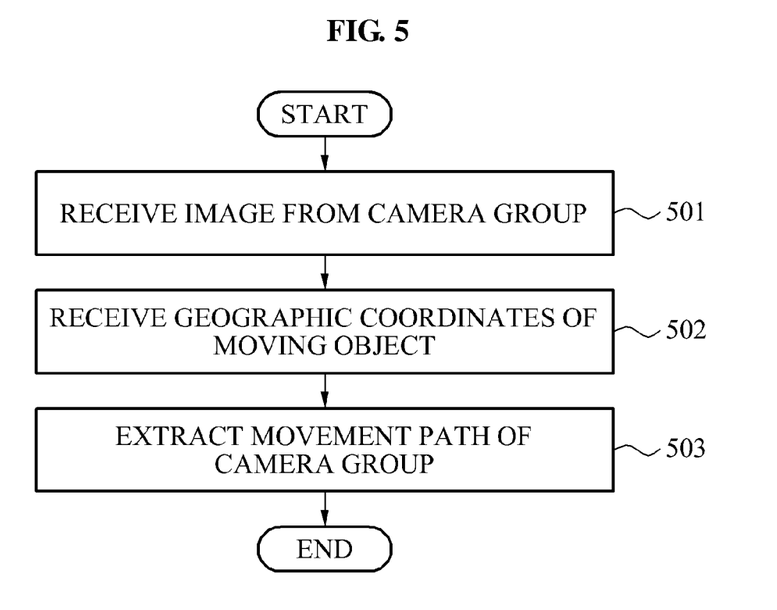
FIG. 5 is a flowchart illustrating a movement path extracting method according to an embodiment of the present invention.

FIG. 5 is a flowchart illustrating a movement path extracting method according to an embodiment of the present invention.

Referring to FIG. 5, in operation 501, a movement path extracting apparatus may receive an image from a camera group in which a mutual positional relationship among cameras is fixed.

In operation 502, the movement path extracting apparatus may receive geographic coordinates of a moving object, using a position receiving apparatus that may verify a position of the moving object on which the camera group is fixed.

In operation 503, the movement path extracting apparatus may extract a movement path of the camera group based on a direction and a position of a reference camera of the camera group, using the received image and the geographic coordinates. The movement path extracting apparatus may extract feature points of images of the reference camera from an image sequence photographed by the camera group. The movement path extracting apparatus may extract a matching result by matching the feature points of the images. The direction and the position of the reference camera may be calculated based on the matching result, and a movement path of the reference camera may be generated as time elapses.

The movement path extracting apparatus may extract feature points of images photographed by cameras remaining after excluding the reference camera from the camera group. The movement path extracting apparatus may extract the feature points using the image sequence photographed by the camera group, match the feature points of the images photographed by the remaining cameras, and extract a matching result.

The movement path extracting apparatus may obtain a stable result of calculating a direction and a position, since an image of a wide range acquired by at least one camera is used. The movement path extracting apparatus may improve a result of improperly calculating the feature points, using an outlier removal algorithm.

The movement path extracting apparatus may calculate directions and positions of all cameras constituting the camera group, using the matching result. The movement path extracting apparatus may calculate the directions and the positions of the reference camera and the remaining cameras constituting the camera group, thereby calculating directions and positions of all cameras constituting the camera group. In particular, the movement path extracting apparatus may calculate a direction and a position of the camera group including the plurality of cameras. When calculating the direction and the position of the camera group, the movement path extracting apparatus may apply a bundle adjustment by adding a relative position and a direction with respect to the reference camera to an optimization parameter.

The movement path extracting apparatus may calculate identical 3D coordinates from the calculated direction and the position of the reference camera and the directions and the positions of the remaining cameras. The movement path extracting apparatus may optimize the direction and the position of the camera group and the calculated 3D coordinates simultaneously using a bundle adjustment.

The movement path extracting apparatus may convert a relative position and direction of the camera group to an absolute position and direction of the camera group. The movement path extracting apparatus may perform the conversion to the absolute position and direction using the received positional information of the moving object.

The movement path extracting apparatus may extract a movement path of the camera group through the conversion to an absolute path with respect to the absolute position and direction of the camera group.

The methods according to the exemplary embodiments of the present invention may be recorded in computer-readable media including program instructions to implement various operations embodied by a computer. The media may also include, alone or in combination with the program instructions, data files, data structures, and the like. The program instructions recorded on the media may be those specially designed and constructed, or they may be of the kind well-known and available to those having skill in the computer software arts.

According to an embodiment of the present invention, a movement path extracting apparatus may analyze images of a camera group in which a mutual positional relationship is fixed and easily calculate a position of the camera group, irrespective of a disposition and a number of cameras.

According to an embodiment of the present invention, a movement path extracting apparatus may convert, to an absolute position and direction, positional information of a moving object and a position and a direction of a camera group based on positions and directions of a reference camera and cameras remaining after excluding the reference camera from the camera group, thereby effectively calculating a direction and a position of the camera group in which spatial geographic information is matched, irrespective of constraints on the camera group in which a mutual positional relationship is fixed.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for extracting a movement path, the apparatus comprising:
a processor configured to:
receive an image from a camera group in which a mutual positional relationship among cameras is fixed;

receive geographic coordinates of a moving object on which the camera group is fixed, wherein the geographic coordinates receiver receives the geographic coordinates of the moving object using a position receiving apparatus to verify a position of the moving object; and extract a movement path of the camera group based on a direction and a position of a reference camera of the camera group and a direction and a position of a remaining cameras and the geographic coordinates, extract feature points of images photographed by the reference camera from an image sequence photographed by the camera group, match the feature points of images photographed by the reference camera, detect the direction and the position of the reference camera based on a result of the matching, extract feature points of images photographed by cameras remaining after excluding the reference camera from the camera group from an image sequence photographed by the camera group, match the feature points of the images photographed by the remaining cameras using a fundamental matrix or an essential matrix based on the direction and the position of the reference camera and a relative positional relationship between the remaining cameras and the reference camera, and detect the direction and the position of the remaining cameras based on a result of the matching.

2. The apparatus of claim 1, wherein the camera group comprises:
a camera group in which projection origins of the cameras are identical; and
a camera group in which projection origins of the cameras are fixed at predetermined intervals.

3. The apparatus of claim 1, wherein the processor comprises:
an image receiver configured to receive the image from the camera group;
a geographic coordinates receiver configured to receive geographic coordinates of the moving object; and
a movement path extractor configured to extract the movement path of the camera group.

4. The apparatus of claim 3, wherein the geographic coordinates receiver is configured to receive the geographic coordinates of the moving object in order to convert a position of the camera group to latitudinal and longitudinal coordinates.

5. The apparatus of claim 3, wherein the movement path extractor is configured to remove a result of matching feature points improperly matched during a process of matching the feature points of the images photographed by the remaining cameras, using an outlier removal algorithm.

6. The apparatus of claim 3, wherein the movement path extractor is configured to extract the movement path of the camera group based on a matrix between neighboring image frames as time elapses using a movement path of the reference camera and a relative positional relationship between the remaining cameras and the reference camera.

7. The apparatus of claim 3, wherein the movement path extractor is further configured to
calculate the directions and the positions of the reference camera and the remaining cameras constituting the camera group,
calculate identical three dimensional (3D) geographic coordinates for the reference camera and the remaining cameras from the calculated direction and the position of the reference camera and the calculated directions and the positions of the remaining cameras, wherein the directions and the positions of the reference camera in the camera group are optimized using a bundle adjustment by adding a relative position of the reference camera and a direction of each of the remaining cameras with respect to the reference camera to an optimization parameter.

8. The apparatus of claim 3, wherein the movement path extractor is configured to convert, to an absolute path of the camera group, the geographic coordinates and a relative movement path of the camera group based on a corresponding relationship of the feature points of the images photographed by the reference camera and the remaining cameras.

9. A method of extracting a movement path, the method comprising:
receiving an image from a camera group in which a mutual positional relationship among cameras is fixed;
receiving geographic coordinates of a moving object on which the camera group is fixed, wherein the receiving is based on verifying a position of the moving object; and
extracting a movement path of the camera group based on a direction and a position of a reference camera of the camera group and a direction and a position of a remaining cameras and the geographic coordinates,
wherein the extracting extracts feature points of images photographed by the reference camera from an image sequence photographed by the camera group, matches the feature points of images photographed by the reference camera, and detects the direction and the position of the reference camera based on a result of the matching, and
wherein the extracting extracts feature points of images photographed by cameras remaining after excluding the reference camera from the camera group from an image sequence photographed by the camera group, matches the feature points of the images photographed by the remaining cameras using a fundamental matrix or an essential matrix based on the direction and the position of the reference camera and a relative positional relationship between the remaining cameras and the reference camera, and detects the direction and the position of the remaining cameras based on a result of the matching.

10. The method of claim 9, wherein the camera group comprises:
a camera group in which projection origins of the cameras are identical; and
a camera group in which projection origins of the cameras are fixed at predetermined intervals.

11. The method of claim 9, wherein the receiving comprises receiving the geographic coordinates of the moving object in order to convert a position of the camera group to latitudinal and longitudinal coordinates.

12. The method of claim 9, wherein the extracting comprises removing a result of matching feature points improperly matched during a process of matching the feature points of the images photographed by the remaining cameras, using an outlier removal algorithm.

13. The method of claim 9, wherein the extracting comprises extracting the movement path of the camera group based on a matrix between neighboring image frames as time elapses using a movement path of the reference camera and a relative positional relationship between the remaining cameras and the reference camera.

14. The method of claim 9, wherein the extracting further comprises:

extracting the movement path of the camera group by calculating the directions and the positions of the reference camera and the remaining cameras constituting the camera group;

calculating identical three dimensional (3D) geographic coordinates for the reference camera and the remaining cameras from the calculated direction and the position of the reference camera and the calculated directions and the positions of the remaining cameras; and optimizing the directions and the positions of the reference camera in the camera group by applying a bundle adjustment by adding a relative position of the reference camera and a direction of each of the remaining cameras with respect to the reference camera to an optimization parameter.

15. The method of claim 9, wherein the extracting comprises converting, to an absolute path of the camera group, the geographic coordinates and a relative movement path of the camera group based on a corresponding relationship of the feature points of the images photographed by the reference camera and the remaining cameras.

16. A non-transitory computer-readable medium storing program instructions that, when executed by a processor, causes the processor to perform the method of claim 9.

17. An apparatus for extracting a movement path, the apparatus comprising:

one or more processors configured to:

to receive an image from a camera group in which a mutual positional relationship among cameras is fixed;

to receive geographic coordinates of a moving object on which the camera group is fixed, wherein the geographic coordinates receiver receives the geographic coordinates of the moving object using a position receiving apparatus to verify a position of the moving object; and to extract a movement path of the camera group based on a direction and a position of a reference camera of the camera group and a direction and a position of a remaining cameras and the geographic coordinates, wherein the one or more processors extracts feature points of images photographed by the reference camera from an image sequence photographed by the camera group, matches the feature points of images photographed by the reference camera, and detects the direction and the position of the reference camera based on a result of the matching, and wherein the one or more processors extracts feature points of images photographed by cameras remaining after excluding the reference camera from the camera group from an image sequence photographed by the camera group, matches the feature points of the images photographed by the remaining cameras using a fundamental matrix or an essential matrix based on the direction and the position of the reference camera and a relative positional relationship between the remaining cameras and the reference camera, and detects the direction and the position of the remaining cameras based on a result of the matching.

* * * * *